United States Patent [19]

Mitchell

[11] Patent Number: 5,074,012
[45] Date of Patent: Dec. 24, 1991

[54] SELF-LOCKING HOLD-DOWN CLAMP

[75] Inventor: Stephen C. Mitchell, West Chester, Ohio

[73] Assignee: Rotex, Inc., Cincinnati, Ohio

[21] Appl. No.: 701,788

[22] Filed: May 17, 1991

[51] Int. Cl.$^5$ ............................................. A44B 21/00
[52] U.S. Cl. .................................... 24/569; 24/514; 24/525; 403/100; 403/317; 411/231
[58] Field of Search ............... 24/569, 514, 525, 535, 24/71; 403/100, 316, 317; 411/153, 231

[56] References Cited

U.S. PATENT DOCUMENTS

| 518,165 | 4/1894 | Thalaker . | |
|---|---|---|---|
| 1,102,863 | 7/1914 | Bojas | 403/100 |
| 1,737,543 | 11/1929 | Mason . | |
| 1,805,443 | 5/1931 | Walters et al. . | |
| 2,587,560 | 2/1952 | Widmer . | |
| 2,981,977 | 5/1961 | Fannen . | |
| 3,433,357 | 3/1969 | Nolte . | |
| 4,385,423 | 5/1983 | Vermilys . | |
| 4,700,437 | 10/1987 | Hoshino | 24/525 |
| 5,020,195 | 6/1991 | Le Vahn | 24/535 |

Primary Examiner—Victor N. Sakran
Attorney, Agent, or Firm—Wood, Herron & Evans

[57] ABSTRACT

A self-locking clamp has a handle which locks to a non-rotating member if the handle starts to turn while in clamping use. The clamp has a retractable collar which is splined to the handle and is biased toward locking engagement with a sleeve that in turn seats against the member to be clamped. The collar can be held retracted from the sleeve for tightening and loosening the clamp.

13 Claims, 3 Drawing Sheets

SELF-LOCKING HOLD-DOWN CLAMP

FIELD OF THE INVENTION

This invention relates to clamps, and more particularly to an adjustable clamp which automatically locks itself against accidental loosening in use. The clamp is especially suitable for use on screening machines and other machines which are subject to substantial vibration.

BACKGROUND

Many types of screening machines include a door or a top cover which is movable relative to a frame or body, and which are clamped tight while the machine is in operation.

Screening machines are of course subjected to strong gyratory and vibrational forces in use, which can tend to loosen a screw clamp. If the clamp is not properly engaged, or if it is not held against rotation, the clamp may gradually loosen. This reduces the clamping force and, if continued, can cause the clamp to come off altogether or at least to permit escape of material being screened.

There has been a need for an adjustable self-locking hold-down clamp which is suitable for use on machinery subject to high vibration, such as screening machines.

THE PRIOR ART

Releasable hold-down clamps for securing a top cover to a screening machine are known in the art, one example being shown in Nolte U.S. Pat. No. 3,433,357. That clamp is an over-center clamp having an effective length which can be adjusted by rotating a handle portion on a threaded shaft. One part of the clamp engages the screen frame while another part of the clamp engages the screen box or door to secure them together.

Thalaker No. 518,165 shows a lock nut wherein loosening of a first nut which has a righthand thread is transmitted by a coil spring to a nut with a lefthand thread, so that loosening of the one tightens the other.

Mason No. 1,737,543 shows a locking arrangement wherein washers tilt and jam against movement.

In Walters No. 1,805,443 keys wedge into slots in a collar to affect clamping.

In Widmer No. 2,587,560, loosening one nut tends to turn a spring which tightens a second nut.

An overcenter clamp handle having locking means is shown in Fannen No. 2,981,977. Undesired rotation of the handle is prevented by a catch which under gravity automatically drops to a position preventing rotation of the handle.

Vermilye No. 4,385,423 shows a safety lock which is automatically cammed over a pin 46 to lock against rotation.

BRIEF DESCRIPTION OF THE INVENTION

This invention provides a self-locking clamp having a screw handle which is engageable with a sleeve that in turn engages the member to be clamped, wherein the sleeve prevents the handle from accidentally rotating. The handle is threaded on a shaft for changing the effective clamping length. The handle is disengageable from the sleeve by axially shifting a splined collar between them.

In the preferred embodiment, the sleeve is journaled on the shaft for both axial rotation and longitudinal movement. The sleeve has at least one ear or post which is engageable with the member to be clamped. A collar is splined for rotation with the handle but is axially movable relative to the handle, into and out of engagement with the sleeve. When axially adjacent the sleeve, the collar rotationally couples to the sleeve at certain angular positions. The collar is spring biased toward abutment with the sleeve. Unless the collar is pulled back away from abutment with the sleeve, the handle can rotate only to the nearest angular position at which the splined collar couples to the sleeve and thereby locks the handle against further rotation. The collar can be selectively held axially out of engagement with the sleeve by shifting and turning it on the handle.

DESCRIPTION OF THE DRAWINGS

The invention can best be further described by reference to the accompanying drawings, in which:

FIG. 3 is a disassembled perspective of the clamp of FIG. 2;

DETAILED DESCRIPTION

Figure 1:
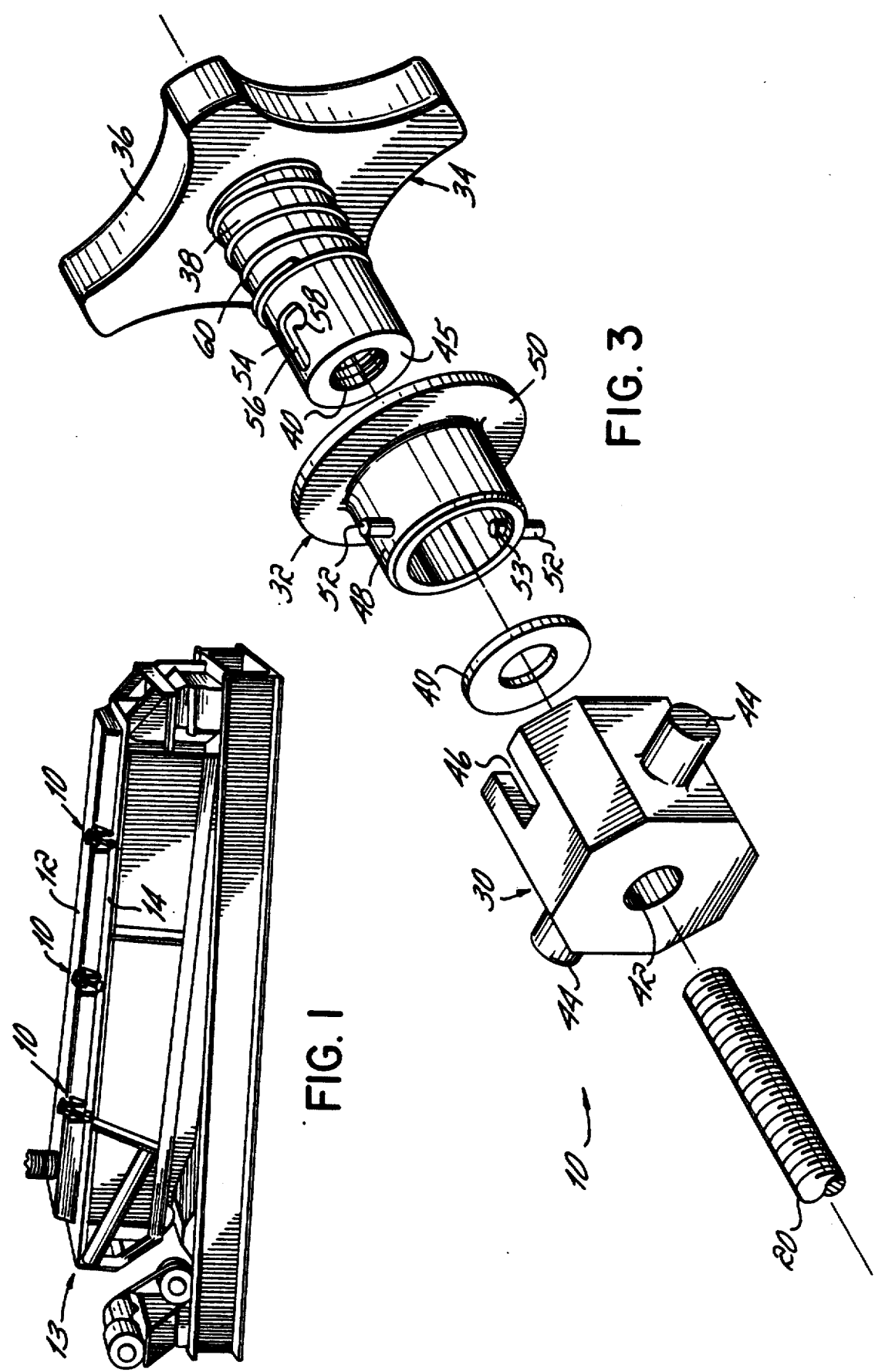
FIG. 1 is perspective view of one type of screening machine on which the clamp of the present invention is useful.

The clamp of the invention is useful, among other purposes, to clamp a door or cover to a door frame or body of a machine. For purposes of explanation, FIG. 1 shows a "Rotex" brand screening machine of the general type shown in Nolte U.S. Pat. No. 3,433,357. As used on that machine, clamps 10 are positioned in generally vertical planes and act downwardly on the cover or door 12 of a machine 13 to hold the cover onto a screen box or frame 14. The clamps are especially useful where the clamping action is in a horizontal plane and gravity does not tend to hold the clamp in place if it becomes loose. An example of the latter type of machine is the "Hi-Cap" machine made by Rotex, Inc., which has large, heavy doors that are held closed by horizontally oriented clamps.

Figure 2:
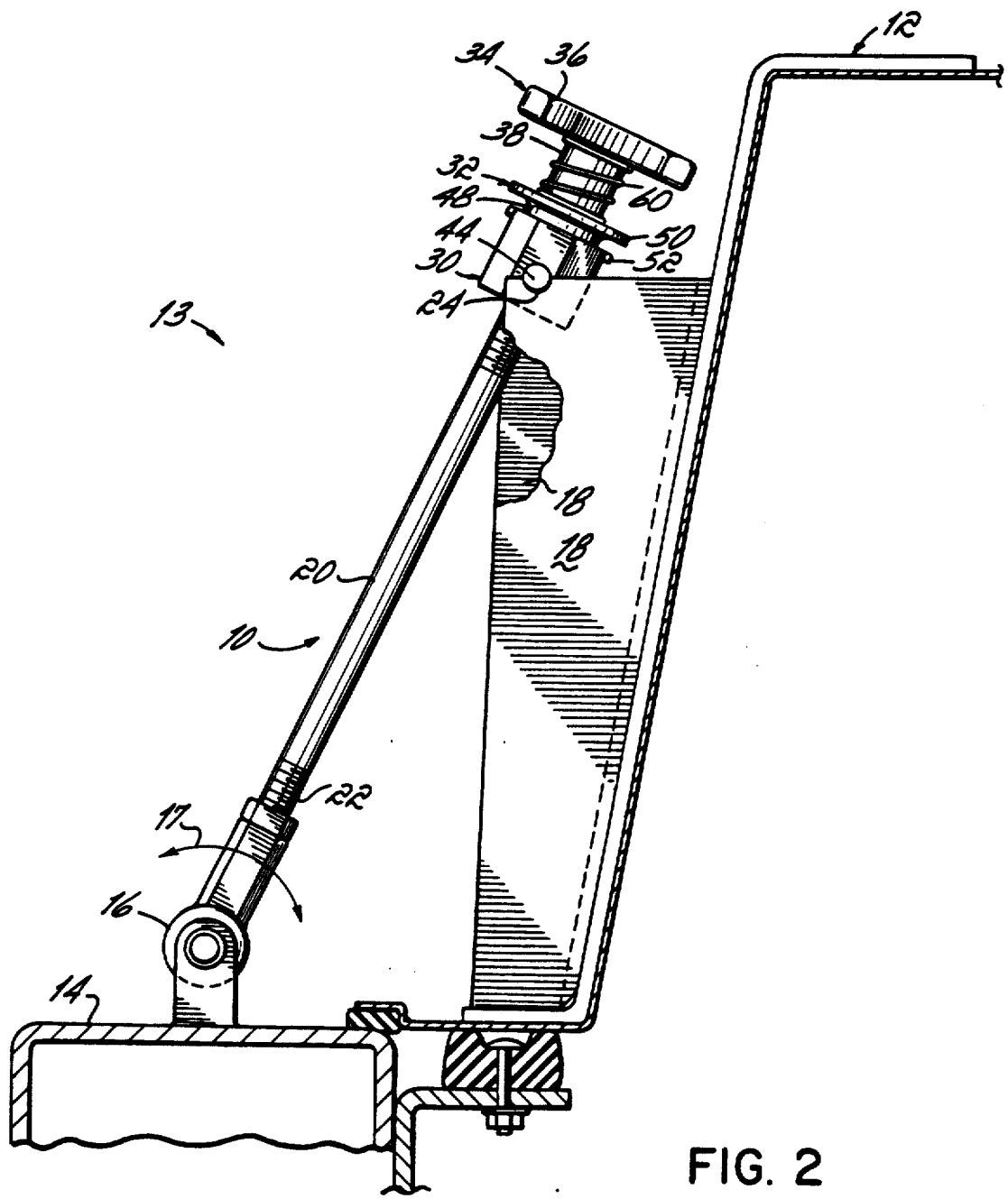
FIG. 2 is an enlarged cross-sectional view of a clamp in accordance with the preferred embodiment of the invention.
Figure 4:
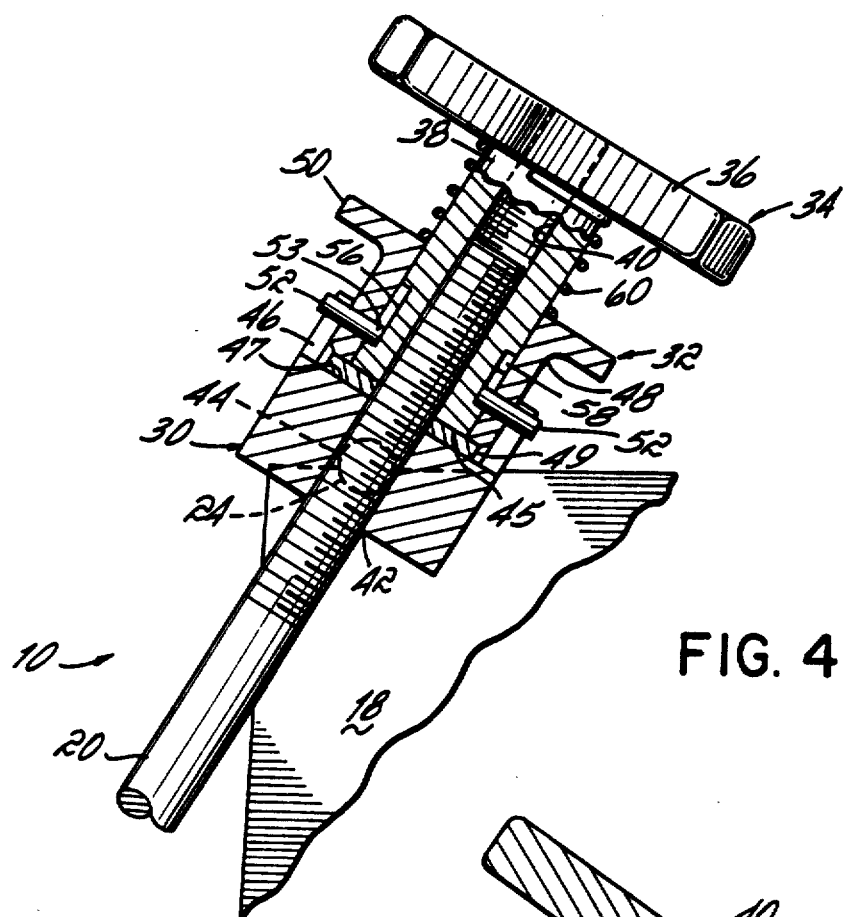
FIG. 4 is an enlarged axial section of the clamp mechanism in locking position.
Figure 5:
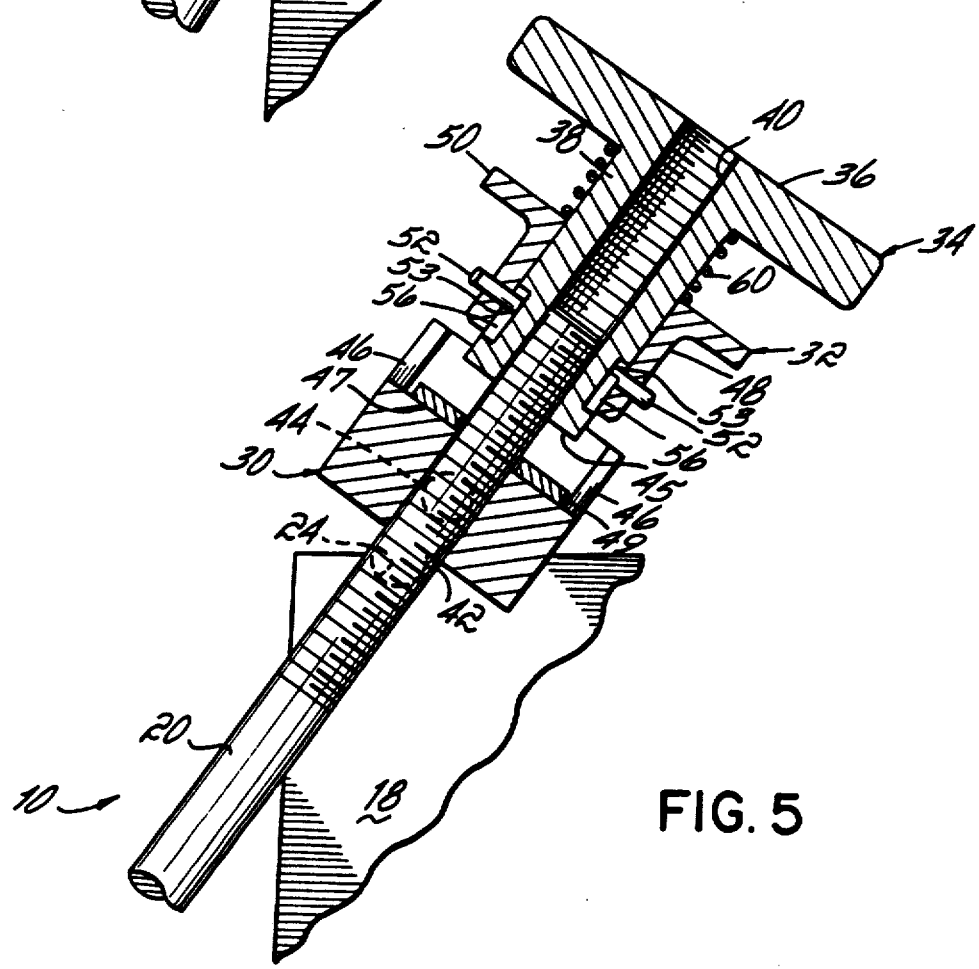
FIG. 5 is an enlarged axial section similar to FIG. 4 but showing the clamp mechanism in loose position, prior to tightening.

At one end the clamp 10 is mounted to the machine frame 14 by a pivot or swingable connection 16 so that the clamp can be swung toward and away from door 12, as indicated by arrow 17. Clamp 10 is engageable with a shoulder or bracket 18 on the door, to draw and hold the door downwardly in FIGS. 1 and 2, toward pivot 16. Preferably two parallel shoulders or brackets 18 on the door straddle the clamp, only one bracket being shown in the drawing.

Clamp 10 includes a shaft 20 which can be a round rod. The rod is threaded and locked at one end 22 to pivotal connection 16. At its other (outer) end, clamp 10 has a length adjusting means which is engageable in notches or cutouts 24 in shoulders 18.

As shown in FIGS. 2–5, the clamp length adjusting means includes three basic components: a sleeve or clamp block 30, a collar 32, and an adjusting handle or knob 34. Handle 34 comprises a hand grip portion 36 and a shank 38 with a threaded central aperture 40 which engages threads on shaft 20. Sleeve 30, which is shown as having an octagonal configuration although this is not critical, has a central aperture 42. It is journaled on shaft 20 and is movable both axially and rotationally, but is not threaded to the shaft. Sleeve 30 has a pair of diametrically opposed, outwardly projecting ears or posts 44, 44, which are sized to be received in the notches 24, 24 of shoulders 18. In principle, only one ear 44 need be provided, but for force balancing diametrically opposed pairs of ears are desirable, as shown. When the ears 44 are seated in the respective notches 24, the sleeve cannot be rotated.

The lower end 45 of handle shank 38 bears against an internal shoulder 47 in sleeve 30, through a washer 49 as a thrust plate. When handle 34 is tightened on shaft 20, its inner end 45 pushes sleeve 30 downwardly. The handle 34 and sleeve 30 are not rotationally coupled except when coupled through collar 32, as will be described. At its upper end or rim, i.e., the upper right end in FIGS. 4 and 5, sleeve 30 has one, and preferably two or more, notches 46 for coupling to the collar.

Collar 32 provides selective rotational coupling between hand grip 36 and sleeve 30, and comprises a tubular body 48 and an outwardly projecting flange 50 of larger diameter. Body 48 has a central opening which is journaled on shank 38 of handle 34. Pins 52, 52 project radially outwardly from body 48, and will interfit in the notches 46 of sleeve 30 to lock the collar against rotation relative to the sleeve. Pins 52, 52 may be roll pins and preferably extend through body 48 with inwardly projecting inner ends 53. The inner ends 53 of pin 52 are captured in closed ended, L-shaped slots 54, 54 (FIG. 3) in the outer surface of handle shank 38. Each slot 54 includes a longitudinal extending portion 56 and a transverse or circumferentially extending upper part 58. Upper part 58 may drop down slightly in order to better hold the collar in retracted position, as will be described. The collar pins 52 are slidable and captured in the respective slots 54, and collar 32 can thus move only limited distances axially and circumferentially relative to the handle 34. The handle 34 and collar 32 form a subassembly which is coupled together. When handle 34 is turned on shaft 20, the collar turns with it. Biasing means in the form of a coil compression spring 60 between handgrip 36 and the flange 50 of collar 32, biases the collar toward sleeve 30. It is convenient to form each of the handle, collar and sleeve by casting.

In assembly, spring 60 is placed on handle shank 38, collar 32 is inserted on the shank and the spring is compressed. The holes for pins 52, 52 are aligned with the respective slots 54 in the shank, and the pins are pressed into place so that the collar is thereafter captured on the shank. Shaft 20 is passed through the aperture 42 in sleeve 30, and is threaded into the aperture 40 of the handle.

The operation of the locking clamp to close and lock door 12 may now be explained. With the handle unscrewed to an outward position on shaft 20, collar 32 is pulled outwardly on shank 38, i.e., toward the handgrip 36, against the bias of spring 60, and is rotated until the collar inner pins 53 ride in the circumferential portions 58 of the slots 54. This holds the collar in a retracted position, away from the sleeve, against the bias of the spring. The door is closed and sleeve ears 44 are set in shoulder notches 24. Handle 36 is then turned on the shaft to advance it toward sleeve 30, while ears 44 hold the sleeve against movement. Continued rotation of handle 34 brings its inner end 45 against collar shoulder 47, and the handle thus pushes sleeve 30 downward, securing and tightening door 12.

When the handle has been tightened to a desired degree, collar 32 is rotated on shank 38 to disengage each pin 52 from its circumferential slot 58. The collar 32 is pushed out of disengagement within and toward sleeve 30 by spring 60. The spring 60 pushes the collar forward so that the outwardly projecting pins 54 engage the rim of sleeve 30. The handle is preferably turned by the operator until pins 52 align with and snap into notches 46, so that the clamp is locked. However, should the operator not lock the clamp and should it be caused to rotate by vibration, splined collar 32 will rotate with the handle until the pins 52 have turned to alignment with sleeve notches 46. Spring 60 pushes the collar to engage the pins 52 in the notches, and thereby automatically locking the handle to the fixed sleeve so that the handle cannot further rotate. Notches 46 are preferably provided every 90° of rotation; then the handle 34 can rotate no more than a ¼ turn, which is insufficient to release the door.

To release the door, the collar 32 is pulled out to disengage its pins 52 from the sleeve notches 46, and is turned so that slots 58 hold it away from the sleeve 30, and the handle 34 is then unscrewed.

Having described the invention, what is claimed is:

1. An adjustable, self-locking hold-down clamp comprising,
   a shaft which is mounted at one end to a first member to be clamped,
   a sleeve journaled on said shaft, said sleeve being rotationally and axially movable on said shaft, said sleeve having at least one ear engageable with a second member to be clamped,
   a knob having threads engaging a second end of said shaft,
   a collar mounted for rotation with said knob and for axial movement into and out of abutment with said sleeve,
   coupling means for rotationally connecting said collar to said sleeve at certain angular positions of said collar with respect to said sleeve, when said collar is axially adjacent said sleeve, thereby to prevent accidental rotation of said knob on said sleeve by locking said knob with respect to said sleeve, and
   means biasing said collar toward abutment with said sleeve, 2. A self-locking clamp in accordance with claim 1 wherein said collar is splined to said knob for rotation therewith.

3. A self-locking clamp in accordance with claim 1 further including releasable means for holding said collar axially away from said sleeve.

4. A self-locking clamp in accordance with claim 1 wherein said collar is journaled on said knob.

5. A self-locking clamp in accordance with claim 4 wherein said knob comprises a hand grip and a shank, and
   said collar is axially slidable on said shank.

6. A self-locking clamp in accordance with claim 5 wherein said biasing means is a spring between said hand grip and said collar.

7. A self-locking clamp in accordance with claim 1 wherein said biasing means is a spring which at one end bears against said knob.

8. A self-locking clamp in accordance with claim 1 wherein said knob has a longitudinal slot and said collar has a pin engaged in said slot which couples said collar to said knob for rotational movement therewith.

9. A self-locking clamp in accordance with claim 8 wherein said slot is L-shaped and includes a longitudinally extending portion and a circumferentially extending portion, said pin when engaged in said circumferentially extending portion holding said collar away from said sleeve.

10. A self-locking clamp in accordance with claim 9 wherein said slot is closed at its ends so that said pin is trapped therein, thereby preventing said collar from separating from said knob.

11. A self-locking clamp in accordance with claim 9 wherein a portion of said pin extends outwardly of said collar, and said coupling means comprises said portion of said pin and a notch on said sleeve into which said portion of said pin is engageable at a particular angular position of said collar with respect to said sleeve.

12. A self-locking clamp in accordance with claim 1 wherein said coupling means comprises at least one pin on said collar and at least one notch in said sleeve into which said pin is engageable at a particular angular position of said collar with respect to said sleeve.

13. A self-locking clamp in accordance with claim 1 wherein said sleeve has a pair of ears which project outwardly on opposite sides of said sleeve, said ears being engageable with said second member to be clamped.

* * * * *